United States Patent
Schatzberg et al.

(10) Patent No.: US 9,930,488 B2
(45) Date of Patent: *Mar. 27, 2018

(54) APPARATUS, SYSTEM AND METHOD OF ESTIMATING A LOCATION OF A MOBILE DEVICE

(71) Applicant: INTEL CORPORATION, Santa Clara, CA (US)

(72) Inventors: Uri Schatzberg, Kiryat Ono (IL); Yuval Amizur, Kfar Saba (IL); Leor Banin, Petach Tikva (IL); Itai Steiner, Tel Aviv (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/213,415

(22) Filed: Jul. 19, 2016

(65) Prior Publication Data

US 2016/0330585 A1 Nov. 10, 2016

Related U.S. Application Data

(63) Continuation of application No. 14/418,148, filed as application No. PCT/US2013/076613 on Dec. 19, 2013, now Pat. No. 9,432,816.

(Continued)

(51) Int. Cl.
*H04W 24/00* (2009.01)
*H04W 4/02* (2018.01)
(Continued)

(52) U.S. Cl.
CPC .......... *H04W 4/023* (2013.01); *H04W 4/026* (2013.01); *H04W 4/043* (2013.01); *H04W 24/10* (2013.01);
(Continued)

(58) Field of Classification Search
CPC ...... H04W 4/043; H04W 24/10; H04W 64/00; H04W 88/08
(Continued)

(56) References Cited

U.S. PATENT DOCUMENTS 9,008,061 B2 4/2015 Takahashi et al.
9,213,093 B2 12/2015 Do et al.
(Continued)

FOREIGN PATENT DOCUMENTS

JP 2011247738 12/2011
RU 2467517 11/2012
WO 2012047767 4/2012

OTHER PUBLICATIONS

Office Action for Korean Patent Application No. 2016-7007261, dated Jan. 30, 2017, 5 pages (Including 2 pages of English translation).

(Continued)

*Primary Examiner* — Amancio Gonzalez
(74) *Attorney, Agent, or Firm* — Shichrur & Co.

(57) ABSTRACT

Some demonstrative embodiments include devices, systems and/or methods of estimating a location of a mobile device. For example, an apparatus may include a wireless communication unit to communicate a message between an access point and a mobile device, the message including a group identifier to indicate the access point belongs to a group of two or more access points having local coordinates measured with respect to a common origin point.

25 Claims, 7 Drawing Sheets

Related U.S. Application Data

(60) Provisional application No. 61/893,292, filed on Oct. 21, 2013.

(51) Int. Cl.
  *H04W 64/00* (2009.01)
  *H04W 4/04* (2009.01)
  *H04W 24/10* (2009.01)
  *H04W 88/08* (2009.01)

(52) U.S. Cl.
  CPC ......... *H04W 64/00* (2013.01); *H04W 64/003* (2013.01); *H04W 88/08* (2013.01)

(58) Field of Classification Search
  USPC ..................................................... 455/456.1
  See application file for complete search history.

(56) References Cited

U.S. PATENT DOCUMENTS

| | | | |
|---|---|---|---|
| 9,432,816 B2* | 8/2016 | Schatzberg | |
| 2010/0165921 A1 | 7/2010 | Maheshwari et al. | |
| 2010/0167758 A1 | 7/2010 | Mukai et al. | |
| 2012/0058778 A1 | 3/2012 | Waters et al. | |
| 2012/0072106 A1 | 3/2012 | Han et al. | |
| 2012/0172051 A1 | 7/2012 | Jeong | |
| 2013/0237227 A1 | 9/2013 | Nagaraja et al. | |

OTHER PUBLICATIONS

Office Action for Japanese Patent Application No. 2016-544314 dated Feb. 21, 2017, 11 pages (Including 6 pages of English translation).

Polk, J. et. al., "Dynamic Host Configuration Protocol Options Coordinate-Based Location Configuration Information", RFC [online][ISSN:2070-1721], Jul. 2011, 37 pages.

Office Action for Russian Patent Application No. 2016110164/07(016690) dated Mar. 20, 2017, 6 pages.

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

IEEE Std 802.11k™-2008. IEEE Standard for Information technology—Telecommunications and information exchange between systems—Local and metropolitan area networks—Specific requirements Part 11: Wireless LAN Medium Access Control (MAC) and Physical Layer (PHY) Specifications Amendment 1: Radio Resource Measurement of Wireless LANs, Jun. 12, 2008, 243 pages.

IEEE Std 802.11u™-2011. IEEE Standard forInformation technology—Telecommunications and information exchangebetween systems—Local and metropolitan area networks—Specific requirements Part 11: Wireless LAN Medium AccessControl (MAC)and Physical Layer (PHY) Specifications Amendment 9: Interworking with External Networks, Feb. 25, 2011, 208 pages.

W3C, Geolocation API Specification, W3C Proposed Recommendation, May 10, 2012, 18 pages.

Open Mobile Alliance, OMA-AD-SUPL-V2_0-20120417-A, Secure User Plane Location Architecture Approved Version 2.0, Apr. 17, 2012, 51 pages.

International Search Report and Written Opinion for International Application No. PCT/US2013/076613, dated Jul. 24, 2014, 10 pages.

International Preliminary Report on Patentability for PCT/US2013/076613, dated May 6, 2016, 9 pages.

Notice of Allowance for U.S. Appl. No. 14/418,148, dated Apr. 11, 2016, 14 pages.

European Search Report for European Patent Application No. 13895856.6 dated Apr. 18, 2017, 10 pages.

"LPP Extensions Specification; OMA-TS-LPPe-V1_1-20131008-D_cb", OMA-TS-LPPE-V1_1-20131008-D_CB, Open Mobile Alliance (OMA), 4330 La Jolla Village Dr., Suite 110 San Diego, CA 92122 ; USA No. 1.1 Oct. 8, 2013, 304 pages.

Office Action for Japanese Patent Application No. 2016-544314, dated Oct. 17, 2017, 8 pages (Including 4 pages of English translation).

* cited by examiner

APPARATUS, SYSTEM AND METHOD OF ESTIMATING A LOCATION OF A MOBILE DEVICE

CROSS REFERENCE

This application claims the benefit of and priority from U.S. Provisional Patent Application No. 61/893,292 entitled "Apparatus, Method And System of Location Estimation", filed Oct. 21, 2013, the entire disclosure of which is incorporated herein by reference.

TECHNICAL FIELD

Embodiments described herein generally relate to estimating a location of a mobile device.

BACKGROUND

Outdoor navigation is widely deployed thanks to the development of various global-navigation-satellite-systems (GNSS), e.g., Global Positioning System (GPS), GALILEO, and the like.

Recently, there has been a lot of focus on indoor navigation. This field differs from the outdoor navigation, since the indoor environment does not enable the reception of signals from GNSS satellites. As a result, a lot of effort is being directed towards solving the indoor navigation problem. This problem does not yet have a scalable solution with satisfactory precision.

One solution for indoor navigation includes a Time-of-Flight (ToF) measurement method. The ToF may be defined as the overall time a signal propagates from a first station, e.g., a user ("client") mobile device, to a second station, e.g., an access point (AP), and back to the first station. A distance between the first and second stations may be calculated based on the ToF value, for example, by dividing the ToF value by two and multiplying the result by the speed of light.

An estimated location of the first station may be determined by calculating two or more distances between the first station and two or more other stations, e.g., other APs, by utilizing a suitable method, e.g., a trilateration method.

The location calculation method may not provide a location estimation with a desired accuracy, for example, if the one or more distances do not have a desired accuracy.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
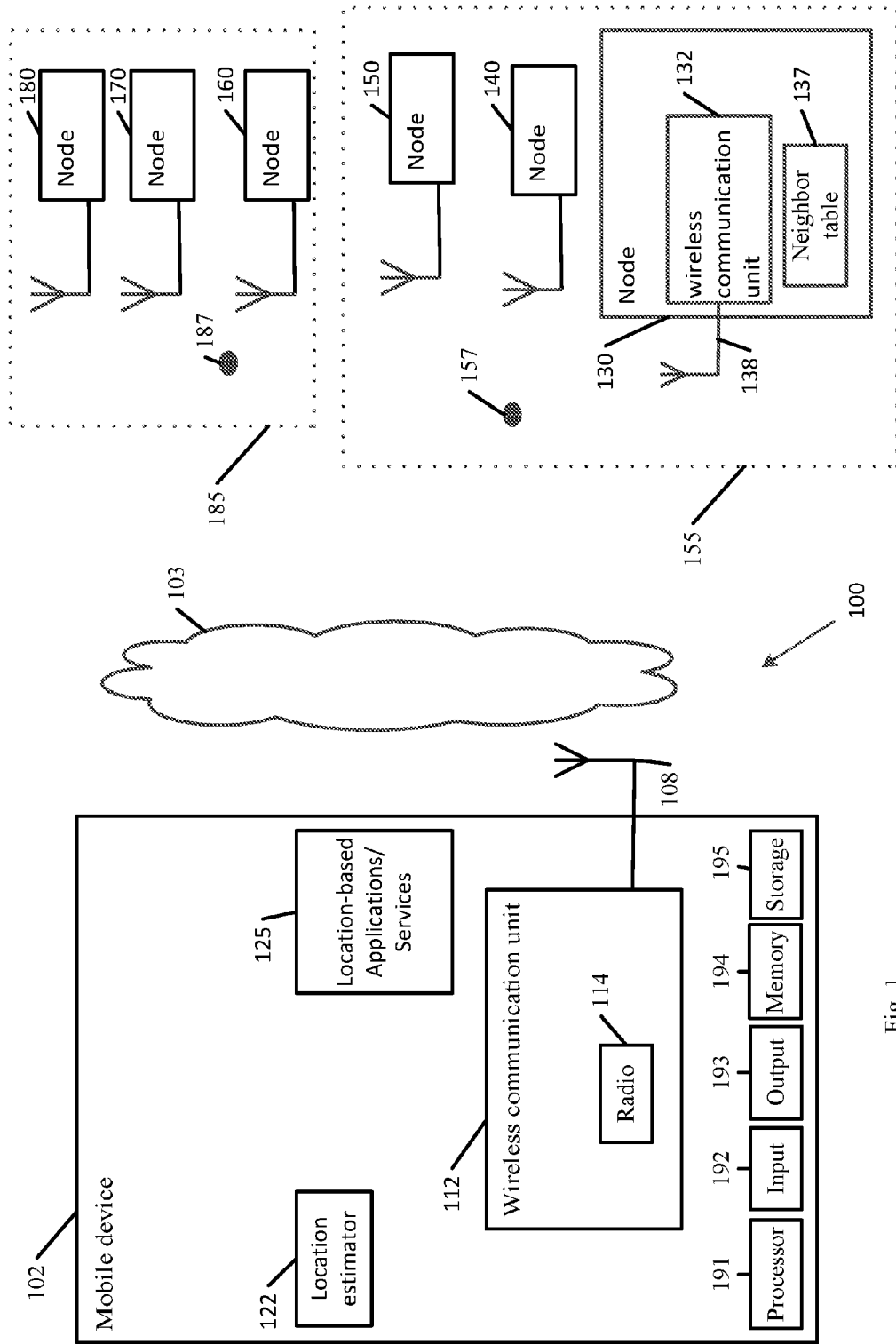
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2102; IEEE802.11 task group ac (TGac) ("IEEE802.11-09/0308r12—TGac Channel Model Addendum Document"); IEEE 802.11k—IEEE Standard for Information technology—Local and metropolitan area networks—Specific requirements—Part 11: Wireless LAN Medium Access Control (MAC) and Physical Layer (PHY) Specifications Amendment 1: Radio Resource Measurement of Wireless LANs, Jun. 12, 2008; IEEE 802.11u-2011—IEEE Standard for Information Technology-Telecommunications and information exchange between systems—Local and Metropolitan networks-specific requirements-Part II: Wireless LAN Medium Access Control (MAC) and Physical Layer (PHY) specifications: Amendment 9: Interworking with External Networks; IEEE 802.11 task group ad (TGad) (IEEE P802.11ad Standard for Information Technology Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band)) and/or future versions and/or derivatives thereof, devices and/or networks operating in accordance with existing Wireless Fidelity (WiFi) Alliance (WFA) Peer-to-Peer (P2P) specifications (WiFi P2P technical specification, version 1.2, 2012) and/or future versions and/or derivatives thereof, devices and/or networks operating in accordance with existing cellular specifications and/or protocols, e.g., $3^{rd}$ Generation Partnership Project (3GPP), 3GPP Long Term Evolution (LTE), and/or future versions and/or derivatives thereof, devices and/or networks operating in accordance with existing Open Mobile Alliance (OMA) standards, including the Secure User Plane Location (SUPL) protocol (SUPL-OMA-AD-SUPL-V2.0) and/or future versions and/or derivatives thereof, devices and/or networks operating in accordance with existing World-Wide-Web Consortium (W3C) standards, including the W3C Hypertext Markup Language (HTML) Version 5, October 2010 and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via a wireless medium (WM) 103. For example, system 100 may include one or more mobile devices, e.g., a mobile device 102, and/or one or more wireless communication nodes, e.g., node 130, node 140, node 150, node 160, node 170 and/or node 180.

In some demonstrative embodiments, wireless medium 103 may include, for example, a radio channel, a cellular channel, an RF channel, a Wireless Fidelity (WiFi) channel, an IR channel, and the like. One or more elements of system 100 may optionally be capable of communicating over any suitable wired communication links.

In some demonstrative embodiments, system 100 may include one or more client STAs, and one or more APs. For example, device 102 may perform the functionality of a client STA and node 130, node 140, node 150, node 160, node 170 and/or node 180 may perform the functionality of an AP, e.g., a WiFi AP, a router, and the like.

In some demonstrative embodiments, node 130, node 140, node 150, node 160, node 170 and/or node 180 may include a mobile or a non-mobile device, e.g., a static device.

In some demonstrative embodiments, node 130, node 140, node 150, node 160, node 170 and/or node 180 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a context-aware device, a video device, an audio device, an A/V device, a Set-Top-Box (STB), a video source, an audio source, a video sink, an audio sink, a stereo tuner, a broadcast radio receiver, a flat panel display, a Personal Media Player (PMP), a data source, a data sink, a, or the like.

In some demonstrative embodiments, mobile device 102 may include, for example, a User Equipment (UE), a mobile computer, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device, a consumer device, a vehicular device, a non-vehicular device, a portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), an "Origami" device or computing device, a video device, an audio device, an A/V device, a gaming device, a media player, a Smartphone, or the like.

In some demonstrative embodiments, device 102, node 130, node 140, node 150, node 160, node 170 and/or node 180 may include wireless communication units, to perform wireless communication between device 102, node 130, node 140, node 150, node 160, node 170 and/or node 180 and/or with one or more other wireless communication devices. For example, device 102 may include a wireless communication unit 112, and/or node 130 may include a wireless communication unit 132.

In some demonstrative embodiments, the wireless communication units may include one or more radios. For example, wireless communication unit 112 and/or wireless communication unit 132 may include a radio 114, e.g., including one or more wireless transmitters, receivers and/or transceivers able to send and/or receive wireless communication signals, RF signals, frames, blocks, transmission streams, packets, messages, data items, and/or data. In one example, the radios may include modulation elements, demodulation elements, amplifiers, analog to digital and digital to analog converters, filters, and/or the like. For example, wireless communication units 112 and/or 132 may include or may be implemented as part of a wireless Network Interface Card (NIC), and the like.

In some demonstrative embodiments, the wireless communication units may include, or may be associated with, one or more antennas. For example, wireless communicate unit 112 may be associated with one or more antennas 108 and wireless communicate unit 132 may be associated with one or more antennas 138.

Antennas 108 and/or 138 may include any type of antennas suitable for transmitting and/or receiving wireless communication signals, blocks, frames, transmission streams, packets, messages and/or data. For example, antennas 108 and/or 138 may include any suitable configuration, structure and/or arrangement of one or more antenna elements, components, units, assemblies and/or arrays. Antennas 108 and/or 138 may include, for example, antennas suitable for directional communication, e.g., using beamforming techniques. For example, antennas 108 and/or 138 may include a phased array antenna, a multiple element antenna, a set of switched beam antennas, and/or the like. In some embodiments, antennas 108 and/or 138 may implement transmit and receive functionalities using separate transmit and receive antenna elements. In some embodiments, antennas 108 and/or 138 may implement transmit and receive functionalities using common and/or integrated transmit/receive elements.

In some demonstrative embodiments, mobile device 102 and/or one or more of nodes 130, 140, 150, 160, 170 and/or 180 may also include, for example, a processor 191, an input unit 192, an output unit 193, a memory unit 194, and a storage unit 195. Mobile device 102 may optionally include other suitable hardware components and/or software components. In some demonstrative embodiments, some or all of the components of mobile device 102 may be enclosed in a common housing or packaging, and may be interconnected or operably associated using one or more wired or wireless links. In other embodiments, components of mobile device 102 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 111 executes instructions, for example, of an Operating System (OS) of mobile device 102 and/or of one or more suitable applications.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 include, for example, a hard disk drive, a floppy disk drive, a Compact Disk (CD) drive, a CD-ROM drive, a DVD drive, or other suitable removable or non-removable storage units. For example, memory unit 194 and/or storage unit 195, for example, may store data processed by mobile device 102.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

In some demonstrative embodiments, device 102, node 130, node 140, node 150, node 160, node 170 and/or node 180 may be located in an indoor environment, for example, a mall, a building, an office and/or the like. In other embodiments, device 102, node 130, node 140, node 150, node 160, node 170 and/or node 180 may be located in any other environment, e.g., an indoor and/or an outdoor location.

In some demonstrative embodiments, mobile device 102 may estimate a location of mobile device 102 within the indoor environment based on a Time of Flight (ToF) measurement, (also referred to as "Fine Time Measurement (FTM)").

The ToF may be defined as the overall time a signal propagates from a first station, e.g., device 102, to a second station, e.g., node 130, node 140, node 150, node 160, node 170 and/or node 180, and back to the first station. A distance between the first and second stations may be determined based on the ToF value, for example, by dividing the ToF value by two and multiplying the result by the speed of light.

In one example, device 102 may transmit a message, denoted M1, to node 130, at a time, denoted t1. The time t1 may be a Time of Departure (ToD), denoted ToD(M1), of the message M1.

In some demonstrative embodiments, node 130 may receive message M1 and determine a time, denoted t2, e.g., by determining a ToA, denoted ToA(M1), of message M1.

In some demonstrative embodiments, node 130 may transmit a message, denoted M1-ACK, to device 102, at a time, denoted t3. Message M1-ACK may include, for example, an acknowledgement message transmitted in response to message M1. The time t3 may be a ToD, denoted ToD(M1-ACK), of the message M1-ACK.

In some demonstrative embodiments, device 102 may receive message M1-ACK and determine a time, denoted t4, e.g., by determining a ToA, denoted ToA(M1-ACK), of message M1-ACK.

In some demonstrative embodiments, node 130 may transmit a message, denoted M2, to device 102. Message M2 may include, for example, information corresponding to the time t2 and/or the time t3. For example, message M2 may include a timestamp, e.g., a ToA timestamp, including the time t2, and a timestamp, e.g., a ToD timestamp, including the time t3.

In some demonstrative embodiments, device 102 may receive message M2. Device 102 may determine a ToF between devices 102 and node 130, for example, based on message M2.

For example, device 102 may determine the ToF based on an average, or any other function, applied to the time values t1, t2, t3 and t4. For example, device 102 may determine the ToF, e.g., as follows:

$$\text{ToF}=[(t4-t1)-(t3-t2)]/2 \qquad (1)$$

In some demonstrative embodiments, device 102 may transmit a message, denoted M2-ACK, to node 130. Message M2-ACK may include, for example, an acknowledgement message transmitted in response to message M2.

In some demonstrative embodiments, device 102 may determine the range between devices 102 and 104 based on the calculated ToF.

For example, device 102 may determine the range, denoted $r_k$, e.g., as follows:

$$r_k=\text{ToF}*C \qquad (2)$$

wherein C denotes the radio wave propagation speed.

In some demonstrative embodiments, device 102 may determine a location of device 102, e.g., an absolute location of device 102, based on the estimated range $r_k$.

For example, device 102 may determine two or more ToF values, e.g., according to Equation 2, with respect to two or more other stations, e.g., nodes 140, 150, and/or other nodes.

Device 102 may determine the location of device 102 based on the two or more ToF values, e.g., by using trilateration techniques.

In some demonstrative embodiments, device 102 may determine the location of device 102 based on a location of the other stations, which are used for the ToF measurements, e.g., nodes 130, 140 and 150.

In some demonstrative embodiments, the location of node 130, node 140, node 150, node 160, node 170 and/or node 180 may be given in global coordinates, e.g., Earth-Centered-Earth-Fixed (ECEF) coordinates, World Geodetic System 1984 (WGS84) coordinates, and/or the like.

In some demonstrative embodiments, applications/services 125 for navigating device 102 within the indoor environment, e.g., an indoor navigation application, may utilize the location of one or more of node 130, node 140, node 150, node 160, node 170 and/or node 180 in local coordinates.

In some demonstrative embodiments, the local coordinates may be used, for example, to enable navigation of device 102 with respect to points and/or locations within the indoor environment, which may be identified based on a local coordinate system having local orientation, for example, based on an orientation of the indoor environment, e.g., an orientation of a building.

In some demonstrative embodiments, the local coordinates may be based on an origin, e.g., the point (0,0), which may be located at a predefined location within the indoor environment, e.g., a point within a building in which device 102 may be navigating.

In some demonstrative embodiments, the global coordinates of the origin and the local orientation of the local coordinate system may be used, for example, to allow uniquely transforming local coordinates into global coordinates, and vice versa.

In some demonstrative embodiments, a location of a node, e.g., node 130, may be defined, e.g., in a database to be used for indoor navigation, for example, by defining the predefined location of the origin and the local orientation of the local coordinate system, measuring the origin location in global coordinates such as ECEF, and measuring the location of the node in the local coordinates, e.g., relative to the origin.

In some demonstrative embodiments, a plurality of nodes, which have locations measured relative to the same common origin may have very high local accuracy, e.g., the distances between all the nodes may be very accurate. In contrast, nodes, which have locations measured with respect to different origins may have relatively large relative accuracy errors, e.g., since it may be very hard to accurately measure the location of the origin in global coordinates.

In one example, nodes 130, 140 and 150 may have very high local accuracy, for example, if a location of nodes 130, 140 and 150 is measured relative to a first origin.

In another example, nodes 130, 160 and 170 may have relatively large relative accuracy errors, for example, if a location of node 130 is measured relative to the first origin and a location of nodes 160 and 170 is measured relative to a second origin, e.g., at a different location from the location of the first origin.

In some demonstrative embodiments, a local position accuracy of a position of device 102 measured with respect to a plurality of nodes may not be affected by an error in the global coordinates of the nodes, for example, if all the nodes are measured relative to the same origin, e.g., as described below.

Figure 2:
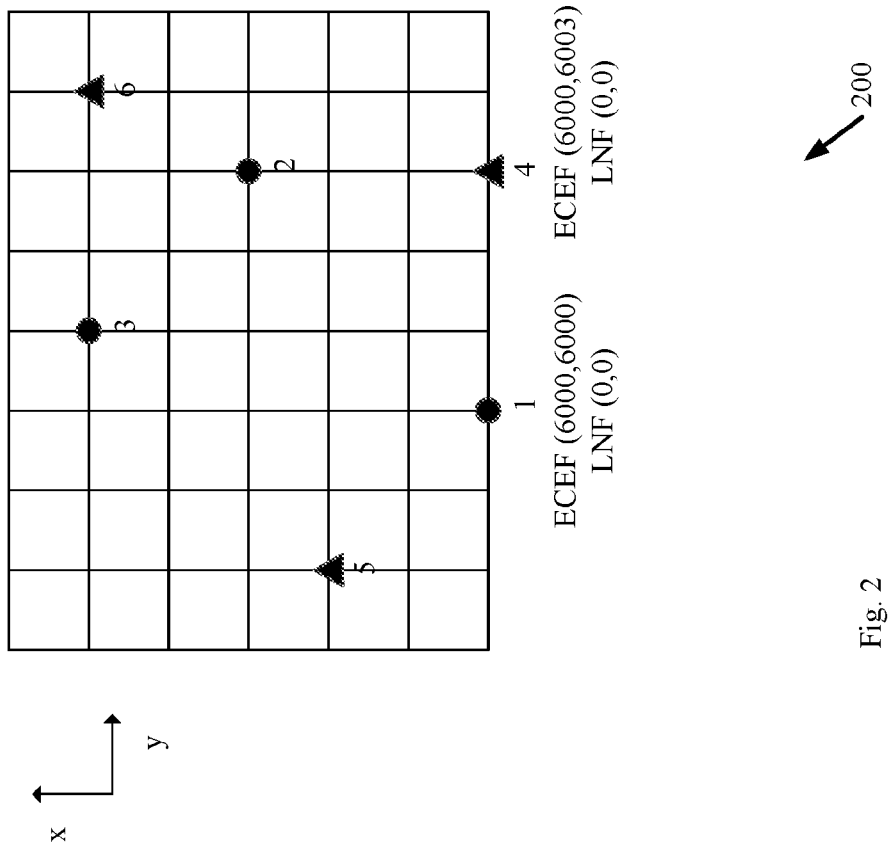
FIG. 2 is a schematic illustration of a deployment of six nodes in an indoor environment, in accordance with some demonstrative embodiments.

Reference is made to FIG. 2, which schematically illustrates a deployment of six nodes in an indoor environment 200, in accordance with some demonstrative embodiments.

As shown in FIG. 2, the six nodes may include a first node, denoted "1", a second node, denoted "2", a third node, denoted "3", a fourth node, denoted "4", a fifth node, denoted "5", and a sixth node, denoted "6". For example, the first, second, third, forth, fifth and sixth nodes may perform the functionality of nodes 130, 140, 150, 160, 170, and 180 (FIG. 1).

As shown in FIG. 2, a first group of nodes, e.g., the first, second and third nodes, may be defined with respect to a first common origin, e.g., the location of the first node, at the global coordinates, e.g., ECEF coordinates (6000,6000).

As shown in FIG. 2, a second group of nodes, e.g., the fourth, fifth and sixth nodes may be defined with respect to a second common origin, e.g., the location of the fourth node, at the global coordinates of (6000,6003).

As shown in FIG. 2, the local and global coordinates of the six nodes may be as follows:

TABLE 1

| Node number | Local Coordinates | Global Coordinates |
| --- | --- | --- |
| 1 | (0, 0) | (6000, 6000) |
| 2 | (3, 3) | (6003, 6003) |
| 3 | (5, 1) | (6005, 6001) |
| 4 | (0, 0) | (6000, 6003) |
| 5 | (2, −5) | (6002, 5998) |
| 6 | (5, 1) | (6005, 6004) |

As shown in Table 1, the third node and the sixth node may have the same local coordinates, e.g., (5,1).

In some demonstrative embodiments, measuring the distance between the third node and the sixth node may include transforming the local coordinates of the third node and the sixth node into global coordinates, and calculating the distance between the global coordinates of the third node and the sixth node.

For example, the distance between the third node and the sixth node, denoted $D_{3-6}$, may be calculated as follows:

$$D_{3-6} = \mathrm{sqrt}((6005-6005)^2 + (6004-6001)^2) = 3m \quad (3)$$

In some demonstrative embodiments, the distance between two nodes belonging to the same group may be calculated using the Global or the local coordinates.

In one example, the distance, denoted $D_{5-6}$, between the fifth node and the sixth node in global coordinates may be calculated as follows:

$$D_{5-6} = \mathrm{sqrt}((6002-6005)^2 + (5998-6004)^2) = 6.7m \quad (4)$$

In another example, the distance, denoted $D_{2-3}$, between the second node and the third node in local coordinates may be calculated as follows:

$$D_{2-3} = \mathrm{sqrt}((2-5)^2 + (-5-1)^2) = 6.7m \quad (5)$$

In some demonstrative embodiments, there may be an error when measuring the global coordinates of at least one of the groups, e.g., the second group. For example, the measured location of the fourth node, which is used as the origin of the second group, may be at the global coordinates (6000,6005), e.g., instead of the actual global coordinates (6000,6003), for example, due to an error when measuring the location of the fourth node.

In some demonstrative embodiments, the error in the global coordinates of the second origin of the second group may affect the global coordinates of the fifth node and the sixth node, which may be determined based on the global coordinates of the second origin, e.g., as follows:

TABLE 2

| AP number | Local Coordinates | Global Coordinates |
| --- | --- | --- |
| 1 | (0, 0) | (6000, 6000) |
| 2 | (3, 3) | (6003, 6003) |
| 3 | (5, 1) | (6005, 6001) |
| 4 | (0, 0) | (6000, 6005) |

TABLE 2-continued

| AP number | Local Coordinates | Global Coordinates |
|---|---|---|
| 5 | (2, −5) | (6002, 6000) |
| 6 | (5, 1) | (6005, 6006) |

In some demonstrative embodiments, the distances determined between the nodes of different groups may be affected by the error in the global coordinates of the second origin of the second group.

For example, a determined distance between the third node and the sixth node, denoted $D'_{3-6}$, based on the error of the location of the fourth node may be calculated as follows:

$$D'_{3-6} = \text{sqrt}((6005-6005)^2 + (6004-6001)^2) = 5m \quad (6)$$

Accordingly, the error at the location of the fourth node may result in an error of 2m in the determined distance $D'_{3-6}$ with respect to the actual distance between the second node and the third node.

In some demonstrative embodiments, the distances determined between the nodes of a common group, e.g., the first group or the second group, may not be affected by the error in the global coordinates of the group.

In one example, the determined distance in global coordinates, denoted $D'_{5-6}$, between the fifth node and the sixth node based on the error of the location of the fourth node may be calculated, for example, as follows:

$$D'_{5-6} = \text{sqrt}((6002-6005)^2 + (6000-6006)^2) = 6.7m \quad (7)$$

In another example, the determined distance, denoted $D'_{2-3}$, in local coordinates, between the second node and the third node may be calculated as follows:

$$D'_{2-3} = ((2-5)^2 + (-5-1)^2) = 6.7m \quad (8)$$

According to the above examples, there may be no error for a distance calculated between nodes from the same group, e.g., whether performed in global or local coordinates.

Referring back to FIG. 1, some demonstrative embodiments may enable defining groups of nodes, which are measured from a same common origin, having the same local orientation and the same local coordinates, e.g., as described below.

In some demonstrative embodiments, the nodes of a group of nodes may share the same origin accuracy characteristics and, accordingly, may eliminate the global origin inaccuracy, e.g., when navigating indoors.

In some demonstrative embodiments, defining the groups of nodes may enable, for example, deriving a much more accurate position from the same nodes, for example, by eliminating the errors associated with nodes of different groups, e.g., as described above.

In some demonstrative embodiments, wireless communication units 112 and 132 may communicate a message including a group identifier to indicate node 130 belongs to a group of two or more nodes having local coordinates measured with respect to a common origin point.

In one example, nodes 130, 140 and 150 may belong to a first group 155 having local coordinates measured with respect to a first common origin point 157; and nodes 160, 170 and 180 may belong to a second group 185 having local coordinates measured with respect to a second common origin point 187, e.g., different from first origin point 157. Accordingly, wireless communication units 112 and/or 132 may communicate a message including a group identifier indicating that node 130 belongs to group 155.

In some demonstrative embodiments, the group identifier may be configured to uniquely identify the group, e.g., the group identifier may include a unique group identifier.

In some demonstrative embodiments, the group identifier may be based on a media-access-control (MAC) address of a node of the group of nodes. For example, the group identifier of group 155 may be based on the MAC address of node 130, and the group identifier of group 185 may be based on the MAC address of node 180.

In one example, the group identifier may include a 64-bit group ID field, which may include, for example, 48 bits of a MAC address of a node assigning the group, followed by 12 bits of a group number, and, optionally, 4 reserved bits. In another example, the group identifier may include any other field and/or may be defined in any other manner.

In some demonstrative embodiments, the message may include local coordinates of node 130 relative to origin point 157.

In some demonstrative embodiments, the message may include group information corresponding to group 155.

In some demonstrative embodiments, the group information may include at least one information element of global coordinates of origin point 157, e.g., ECEF and/or WGS84 coordinates of origin point 157, a measurement accuracy of the global coordinates origin point 157, and/or orientation information defining an orientation of the local coordinates, e.g., relative to the global coordinates or any other coordinate system.

For example, the orientation information may include a global coordinate, e.g., ECEF coordinate, and a local coordinate corresponding to the global coordinate of at least one location, for example, such that the orientation may be determined based on the global coordinates of the origin and the global and local coordinate of the at least one location. In another example, the orientation information may include an x or y orientation; a standard North East Down (NED) system or LNF coordinate systems, e.g., x—north, y—east, z—down, or any other orientation information.

In some demonstrative embodiments, the message may include a beacon broadcasted by node 130.

In some demonstrative embodiments, the beacon broadcasted by node 130 may include the group identifier of group 155 and/or the local coordinates of node 130 relative to origin point 157.

In some demonstrative embodiments, the message may include a probe request transmitted from device 102 to node 130.

In some demonstrative embodiments, the probe request may include the group identifier of group 155.

In some demonstrative embodiments, the message may include a probe response transmitted from node 130 to device 102, e.g., in response to the probe request.

In some demonstrative embodiments, the probe response may include at least the group identifier of group 155 and/or the local coordinates of node 130 relative to origin point 157 and/or relative to the global coordinates.

In some demonstrative embodiments, the message may include a Location Configuration Information (LCI) request transmitted from device 102 to node 130.

In some demonstrative embodiments, the request frame may include a field identifying a particular group identifier. For example, device 102 may transmit the request frame to node 130 including the group identifier of group 155.

In some demonstrative embodiments, the LCI request may include a first indication flag to request the group information. For example, the first indication flag may include a bit, which may have a predefined value, e.g., "1", representing the indication flag to indicate that the group information is requested. For example, device 102 may transmit the request frame to node 130 including the first indication flag set to "1" to request group information of group 155.

In some demonstrative embodiments, the LCI request frame may include a second indication flag to indicate a type of information requested to be reported. For example, the second indication flag may include an indication to report a location of node 130, node 140, node 150, node 160, node 170 and/or node 180 with local coordinates and/or global coordinates.

In some demonstrative embodiments, the LCI request frame may include a third indication flag to request for the location of nodes, which are part of a particular group. For example, device 102 may send the LCI request frame to node 150 to request node 150 to send the local coordinates of one or more nodes within group 185.

Figure 3:
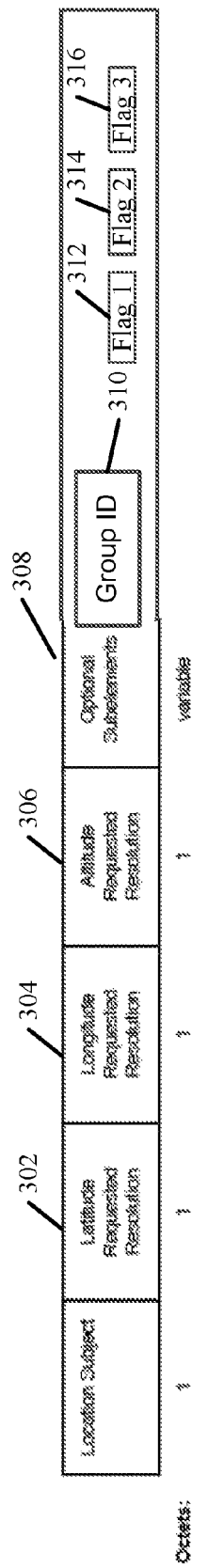
FIG. 3 is a schematic illustration of a location configuration information (LCI) request frame, in accordance with some demonstrative embodiments.

Reference is made to FIG. 3, which schematically illustrates an LCI request frame 300, in accordance with some demonstrative embodiments. For example, device 102 (FIG. 1) may transmit LCI request frame 300 to node 130 (FIG. 1) to request the group information of group 155 (FIG. 1).

As shown in FIG. 3, LCI request frame 300 may include a Latitude field 302, a Longitude field 304, an Altitude field 306 and an Optional Subelements field 308. For example, Latitude field 302, Longitude field 304, and/or Altitude field 306 may include a requested resolution to be used for providing the Latitude, Longitude and/or Altitude coordinates of an origin of the group.

In some demonstrative embodiments, Optional Subelements field 308 may include a group identifier 310, a first indication flag 312, a second indication flag 314 and/or a third indication flag 316, e.g., as described above.

Referring back to FIG. 1, in some demonstrative embodiments, wireless communication unit 112 and/or 132 may communicate an LCI report frame transmitted from node 130 to device 102, e.g., in response to the LCI request frame, e.g., LCI request frame 300 (FIG. 3).

In some demonstrative embodiments, the LCI report frame may include a field including the group identifier, and local coordinates of node 130. For example, the LCI report may include the group identifier of group 155 and local coordinates of node 130 relative to origin 157 and/or relative to the global coordinates.

In some demonstrative embodiments, the LCI report frame may also include the type of the local coordinate system and/or the type of orientation, e.g., as described above.

In some demonstrative embodiments, the LCI report frame may also include local coordinate information relating to the local coordinates of nodes of the group. For example, the LCI report frame with respect to group 185 may include local coordinates of nodes 160, 170 and/or 180.

In some demonstrative embodiments, the local coordinate information may include X, Y, Z coordinates, a resolution and/or an accuracy for one or more nodes, e.g., each node of the group.

Figure 4:
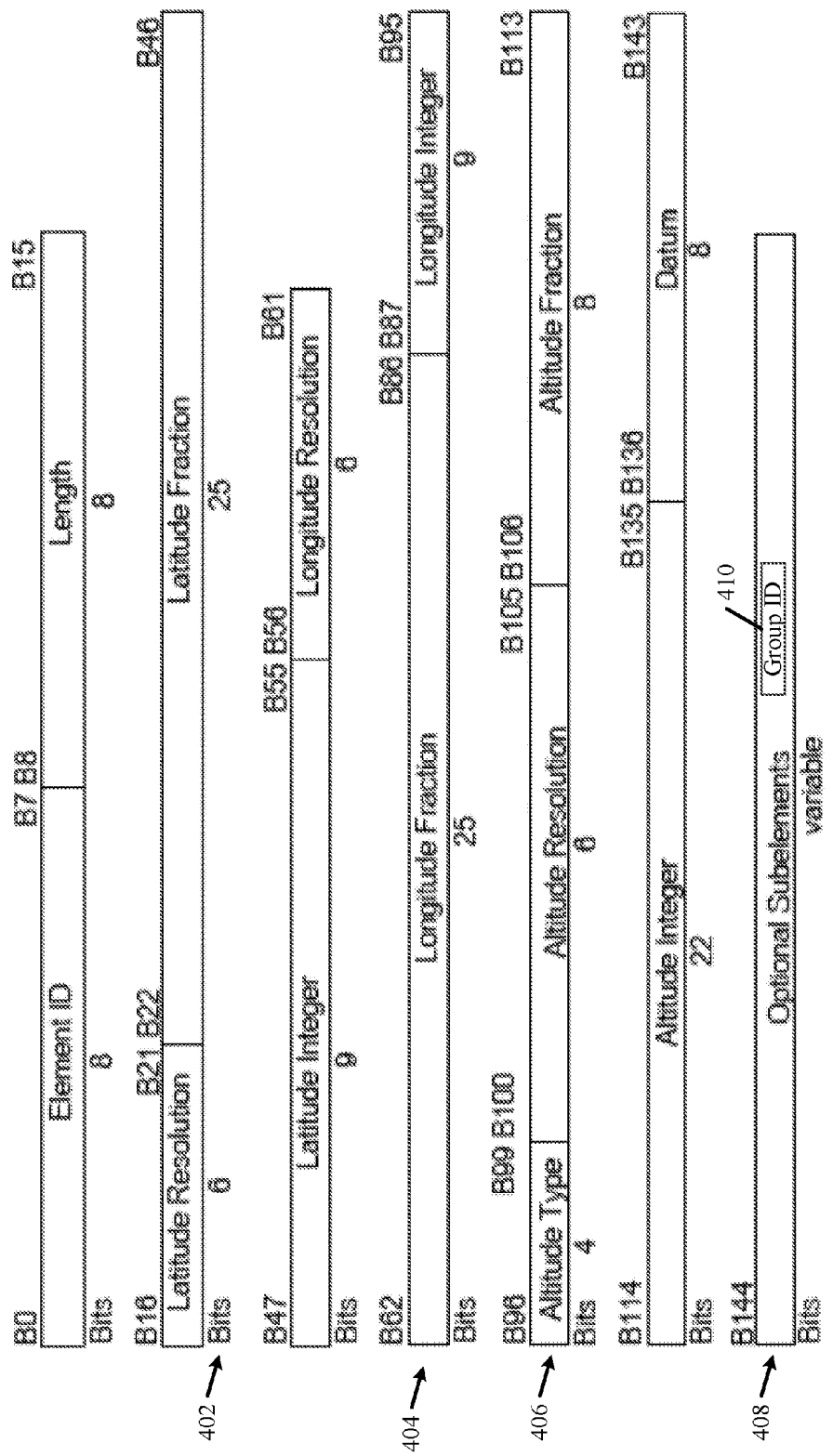
FIG. 4 is a schematic illustration of an LCI report frame, in accordance with some demonstrative embodiments.

Reference is made to FIG. 4, which schematically illustrates an LCI report frame 400, in accordance with some demonstrative embodiments. For example, node 130 (FIG. 1) may transmit LCI report frame 400 to device 102 (FIG. 1) to provide the group information of group 155 (FIG. 1).

As shown in FIG. 4, LCI report frame 400 may include a Latitude field 402, a Longitude field 404, an Altitude field 406, and an Optional Subelements field 408.

In some demonstrative embodiments, the local coordinates of a node providing the LCI report frame 400 may be included in a Latitude field 402, e.g., including first coordinate of the node in the local coordinates, e.g., a "Y" coordinate of a Cartesian coordinate system, a Longitude field 404, e.g., including a second coordinate of the node in the local coordinates, e.g., an "X" coordinate of a Cartesian coordinate system, and/or an Altitude field 406, e.g., including a third coordinate of the node in the local coordinates, e.g., a "Z" coordinate of a Cartesian coordinate system.

In some demonstrative embodiments, Optional Subelements field 408 may include a group identifier field 410, the type of the local coordinates system, the type of orientation and/or the local coordinates of nodes of the group, e.g., as described above.

In one example, LCI report frame 400 may be transmitted from node 130 (FIG. 1) to device 102 (FIG. 1). Latitude field 402 may include the Latitude of node 130 (FIG. 1), Longitude field 404 may include the Longitude of node 130 (FIG. 1), and/or Altitude field 406 may include the Altitude of node 130 (FIG. 1), in local coordinates, e.g., using the X, Y and Z Cartesian coordinates, relative to origin 157 (FIG. 1). Group identifier field 410 may include the group identifier of group 155 (FIG. 1). LCI report frame 400 may also include the type of the local coordinates system and the type of orientation; and/or the local coordinates of nodes 140 and 150 (FIG. 1), for example, if LCI request frame 300 (FIG. 3) is transmitted from device 102 (FIG. 1) to node 130 (FIG. 1) and includes the group identifier of group 155.

In another example, LCI report frame 400 may be transmitted from node 180 (FIG. 1) to device 102 (FIG. 1). Latitude field 402 may include a Latitude of node 180 (FIG. 1), Longitude field 404 may include a Longitude of node 180 (FIG. 1), and/or Altitude field 406 may include an Altitude of node 180 (FIG. 1), in local coordinates, e.g., using the X, Y and Z Cartesian coordinates, relative to origin 187 (FIG. 1). Group identifier field 410 may include the group identifier of group 185 (FIG. 1). LCI report frame 400 may also include the type of the local coordinates system and the type of orientation; and/or the local coordinates of nodes 160 and 170 (FIG. 1), for example, if LCI request frame 300 (FIG. 3) is transmitted from device 102 (FIG. 1) to node 180 (FIG. 1) and includes the group identifier of group 185.

Referring back to FIG. 1, in some demonstrative embodiments wireless communication units 112 and/or 132 may communicate a neighbor report frame between device 102 and node 130.

In some demonstrative embodiments, node 130 may store a neighbor table 137 including information regarding one or more neighbor nodes ("AP group information").

In some demonstrative embodiments, device 102 may be able to request from node 130 the AP group information.

In some demonstrative embodiments, device 102 may send to node 130 a request neighbor report frame, e.g., via wireless communication unit 112.

In some demonstrative embodiments, node 130 may receive the request neighbor report frame and may transmit to device 102 a response neighbor report frame, e.g., via wireless communication unit 132, in response to the request neighbor report frame.

In some demonstrative embodiments, the response neighbor report frame may include the AP group information.

In some demonstrative embodiments, the AP group information may include, for example, information from one or more tables in a management information base (MIB) stored by node 130, relating to one or more neighboring nodes, which may be candidates for a service set transition in the MIB, e.g., a table dot11RRMNeighborReportTable in the MIB.

In some demonstrative embodiments, the AP group information may enable device 102 to gain information about the neighboring nodes of node 130, for example, to be used as potential roaming candidates, e.g., when device 102 is moving closer to the neighboring nodes of node 130.

In one example, device 102 may transmit to node 130 the request neighbor report frame, node 130 may send the response neighbor report frame including AP group information of nodes of group 185. The AP group information may include, for example, the local and/or global coordinates, the accuracy of the local and/or global coordinates and/or the resolution of nodes 160, 170 and/or 180 of group 185.

In some demonstrative embodiments, the AP group information may be, for example, included in the neighbor report response frame as part of a new dedicated Information Element (IE).

In some demonstrative embodiments, the AP group information may be, for example, added to an existing element of the response neighbor report frame, for example, added to the Neighbor Report Element or added to a Basic Service Set ID (BSSID) Information Field, e.g., as described below.

Figure 5:
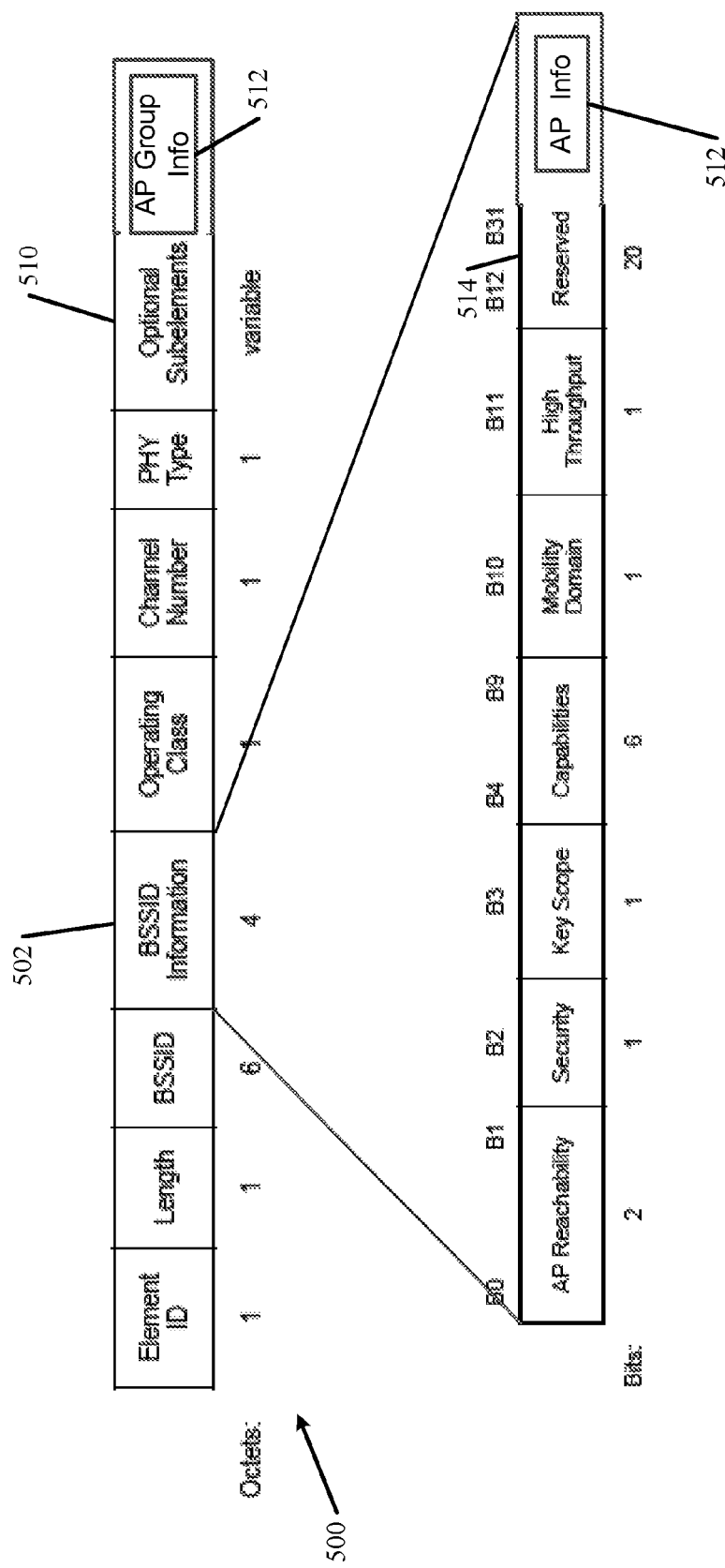
FIG. 5 is a schematic illustration of a response neighbor report frame, and a Basic Service Set Identifier (BSSID) information field of the response neighbor report frame, in accordance with some demonstrative embodiments.

Reference is made to FIG. 5, which schematically illustrates a response neighbor report frame 500, and a BSSID information field 502 of response neighbor report frame 500, in accordance with some demonstrative embodiments. For example, node 130 (FIG. 1) may transmit response neighbor report frame 500 to device 102 (FIG. 1).

As shown in FIG. 5, response neighbor report frame 500 may include an Optional Subelements field 510.

In one example, Optional Subelements field 510 may include an AP group information field 512.

In another example, BSSID information field 502 may include Reserved field 514, and Reserved field 514 may include AP group information field 512.

In some demonstrative embodiments, AP group information field 512 may include, for example, the local and/or global coordinates of node 180 (FIG. 1), the accuracy of the local and/or global coordinates and/or the resolution of the coordinates of nodes 160, 170 and/or 180 of group 185 (FIG. 1), e.g., as described above.

Referring back to FIG. 1, in some demonstrative embodiments, device 102 may utilize the group information and/or the AP group information to perform a position calculation having a relatively increased accuracy.

In some demonstrative embodiments, device 102 may utilize the group information and/or the AP group information to select one or more nodes of nodes 130, 140, 150, 160, 170 and/or 180 to perform the position calculation.

In some demonstrative embodiments, wireless communication unit 112 may receive a message including a group identifier to indicate a group of two or more access points having local coordinates measured with respect to a common origin point. For example, wireless communication unit 112 may receive, for example, the beacon frame, the probe response and/or the LCI report frame from node 130, e.g., as described above.

In some demonstrative embodiments, device 102 may include a location estimator 122 to select one or more nodes to be used by mobile device 102 to estimate a location of mobile device 102 based on the message.

In some demonstrative embodiments, location estimator 122 may select the one or more nodes based on a group identifier of the group. For example, location estimator 122 may select nodes 130, 140 and/or 150 to estimate the location of device 102, e.g., by performing ToF measurements with nodes 130, 140 and/or 150, based on the group identifier of group 155.

In another example, location estimator 122 may select nodes 160, 170 and/or 180 to estimate the location of device 102, e.g., by performing ToF measurements with nodes 160, 170 and/or 180, based on the group identifier of group 185.

In some demonstrative embodiments, location estimator 122 may prioritize a node belonging to the group over a node not belonging to the group. For example, location estimator may prefer nodes 130, 140 and/or 150 of group 155 over nodes 160, 170 and/or 180 of group 185 to estimate the location of device 102, for example, if the group identifier includes the group identifier of group 155.

In some demonstrative embodiments, location estimator 122 may select a plurality of nodes to be used to estimate a location of mobile device 102, each of the plurality of nodes belonging to the same group of nodes. For example, location estimator 122 may select nodes 130, 140 and 150, which belong to group 155.

In one example, location estimator 122 may prefer selecting nodes from the same group, e.g., instead of selecting two nodes from one of the groups and a node from another one of the groups.

In some demonstrative embodiments, location estimator 122 may select a plurality of nodes to be used to estimate the location of mobile device 102, which do not belong to the same group. For example, location estimator 122 may select nodes 130, 140 and 170 to estimate the location of mobile device 102, for example, if wireless communication unit 132 may not be able to communicate with node 150, e.g., if a communication path with node 150 is blocked.

In some demonstrative embodiments, location estimator 122 may apply a first weight to a location-related measurement with a node not belonging to the group of nodes, and a second weight, e.g., greater than the first weight, to a location-related measurement with a node belonging to the group of nodes.

For example, location estimator 122 may apply a first weight to ToF measurements with nodes 130 and 140, which belong to group 155; and a second weight, e.g., lesser than the first weight, to a ToF measurement with node 170, which does not belong to group 155.

Figure 6:
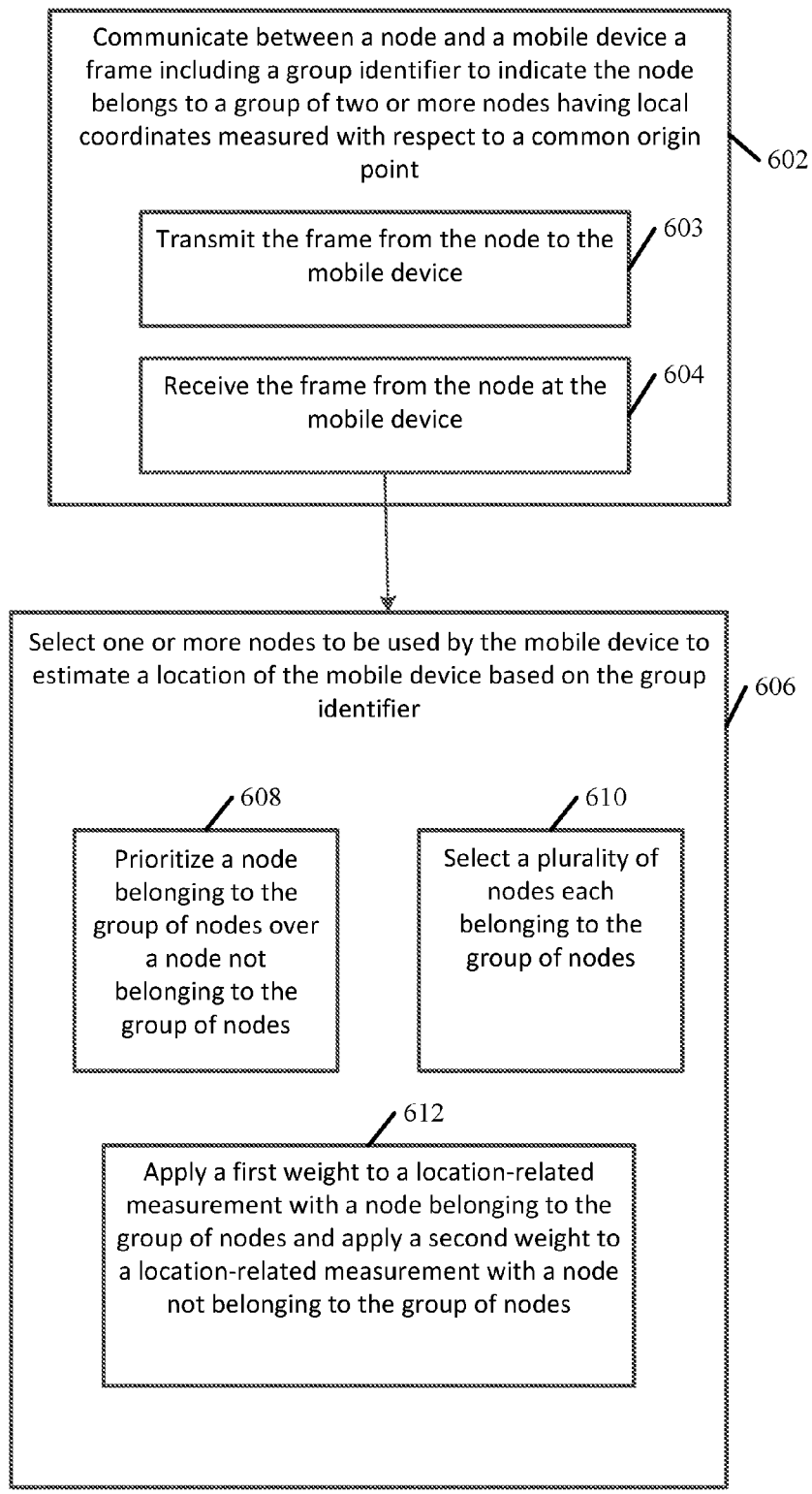
FIG. 6 is a schematic illustration of a method of estimating a location of a mobile device, in accordance with some demonstrative embodiments.

Reference is made to FIG. 6, which schematically illustrates a method of estimating a location of a mobile device, in accordance with some demonstrative embodiments. In some demonstrative embodiments, one or more of the operations of the method of FIG. 6 may be performed by any suitable wireless communication system, e.g., system 100 (FIG. 1), a mobile device, e.g., device 102 (FIG. 1), a node, e.g., nodes 130, 140, 150, 160, 170 and/or 180 (FIG. 1), a wireless communication unit, e.g., wireless communication units 112 and/or 132 (FIG. 1) and/or a location estimator, e.g., location estimator 122 (FIG. 1).

As indicated at block 602, the method may include communicating between a node and a mobile device a message including a group identifier to indicate the node belongs to a group of two or nodes having local coordinates measured with respect to a common origin point. For example, wireless communication units 112 and 132 (FIG. 1) may communicate the message including the group identifier of group 155 (FIG. 1), e.g., as described above.

As indicated at block 603, communicating the message between the node and the mobile device may include transmitting the message from the node. For example, wireless communication unit 132 (FIG. 1) may transmit the message from node 130 (FIG. 1), e.g., as described above.

As indicated at block 604, communicating the message between the node and the mobile device may include receiving the message from the node. For example, wireless communication unit 112 (FIG. 1) may receive the message from node 130 (FIG. 1), e.g., as described above.

As indicated at block 606, the method may include selecting, based on the group identifier, one or more nodes to be used by the mobile device to estimate a location of the mobile device. For example, location estimator 122 (FIG. 1) may select nodes 130, 140 and 150 (FIG. 1) based on the group identifier of group 155 (FIG. 1), e.g., as described above.

As indicated at block 608, selecting the one or more nodes to be used by the mobile device may include prioritizing a node belonging to the group of nodes over a node not belonging to the group of nodes. For example, location estimator 122 (FIG. 1) may prioritize nodes 130, 140 and 150 (FIG. 1), which belong to group 155 (FIG. 1), over nodes 160, 170 and/or 180 (FIG. 1), which belong to group 185 (FIG. 1), e.g., as described above.

As indicated at block 610, selecting the one or more nodes to be used by the mobile device may include selecting a plurality of nodes each belonging to the group of nodes. For example, location estimator 122 (FIG. 1) may select nodes 130, 140 and 150 (FIG. 1), each belonging to group 155 (FIG. 1), e.g., as described above.

As indicated at block 612, selecting the one or more nodes to be used by the mobile device may include applying a first weight to a location-related measurement with a node belonging to the group of nodes, and applying a second weight to a location-related measurement with a node not belonging to the group of nodes. For example, location estimator 122 (FIG. 1) may apply the first weight to measurements with nodes 130 and 140 (FIG. 1), which belong to group 155 (FIG. 1), and the second weight to measurements with node 180 (FIG. 1), which belongs to group 185 (FIG. 1), e.g., as described above.

Figure 7:
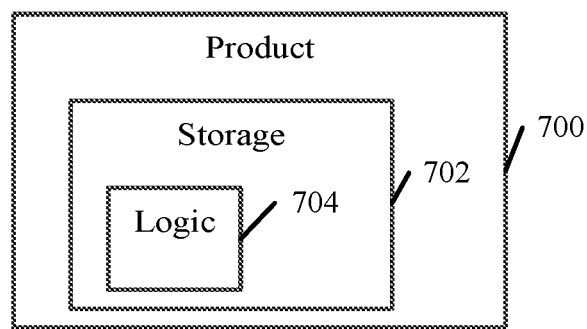
FIG. 7 is a schematic illustration of an article of manufacture, in accordance with some demonstrative embodiments.

Reference is made to FIG. 7, which schematically illustrates a product of manufacture 700, in accordance with some demonstrative embodiments. Product 700 may include a non-transitory machine-readable storage medium 702 to store logic 704, which may be used, for example, to perform at least part of the functionality of device 102 (FIG. 1), wireless communication unit 112 (FIG. 1), wireless communication unit 132 (FIG. 1), nodes 130, 140, 150, 160, 170 and/or 180 (FIG. 1), location estimator 122 (FIG. 1) and/or to perform one or more operations of the method of FIG. 6. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Examples

The following examples pertain to further embodiments.

Example 1 includes an apparatus comprising a wireless communication unit to communicate a message between an access point and a mobile device, the message including a group identifier to indicate the access point belongs to a group of two or more access points having local coordinates measured with respect to a common origin point.

Example 2 includes the subject matter of Example 1, and optionally, wherein the message includes local coordinates of the access point relative to the common origin point.

Example 3 includes the subject matter of Example 1 or 2, and optionally, wherein the message includes group information corresponding to the group of access points, the group information including at least one information element selected from the group consisting of global coordinates of the origin point, a measurement accuracy of the global coordinates of the origin point, and orientation information defining an orientation of the local coordinates.

Example 4 includes the subject matter of any one of Examples 1-3, and optionally, wherein the message comprises a neighbor report frame transmitted from the access point to the mobile device.

Example 5 includes the subject matter of any one of Examples 1-3, and optionally, wherein the message comprises a Location Configuration Information (LCI) Request transmitted from the mobile device to the access point, the LCI Request including a field, which includes the group identifier.

Example 6 includes the subject matter of any one of Examples 1-3, and optionally, wherein the message comprises a Location Configuration Information (LCI) Response, transmitted from the access point to the mobile device, the LCI Response including a field, which includes the group identifier, and local coordinates of the access point.

Example 7 includes the subject matter of any one of Examples 1-3, and optionally, wherein the message comprises a beacon broadcasted by the access point.

Example 8 includes the subject matter of any one of Examples 1-3, and optionally, wherein the message comprises a probe request transmitted from the mobile device to the access point.

Example 9 includes the subject matter of any one of Examples 1-3, and optionally, wherein the message comprises a probe response transmitted from the access point to the mobile device.

Example 10 includes the subject matter of any one of Examples 1-9, and optionally, wherein the group identifier is based on a media-access-control (MAC) address of an access point of the group of access points.

Example 11 includes the subject matter of any one of Examples 1-10, and optionally, comprising the access point.

Example 12 includes the subject matter of any one of Examples 1-10, and optionally, comprising the mobile device.

Example 13 includes the subject matter of any one of Examples 1-10, and optionally, wherein the wireless communication unit is to receive the message.

Example 14 includes the subject matter of any one of Examples 1-10, and optionally, wherein the wireless communication unit is to transmit the message.

Example 15 includes a mobile device comprising at least one antenna; a wireless communication unit to receive via the antenna a message including a group identifier to indicate a group of two or more access points having local coordinates measured with respect to a common origin point; and a location estimator to select, based on the group identifier, one or more access points to be used by the mobile device to estimate a location of the mobile device.

Example 16 includes the subject matter of Example 15, and optionally, wherein the location estimator is to prioritize an access point belonging to the group of access points over an access point not belonging to the group of access points.

Example 17 includes the subject matter of Example 15, and optionally, wherein the location estimator is to select a plurality of access points to be used to estimate a location of the mobile device, each of the plurality of access points belonging to the group of access points.

Example 18 includes the subject matter of Example 17, and optionally, wherein the location estimator is to select an access point not belonging to the group of access points, the location estimator is to apply a first weight to a location-related measurement with the access point not belonging to the group of access points, and the location estimator is to apply a second weight to a location-related measurement with an access point belonging to the group of access points, the second weight is greater than the first weight.

Example 19 includes the subject matter of any one of Examples 15-18, and optionally, wherein the message includes local coordinates of an access point of the group of access points relative to the common origin point.

Example 20 includes the subject matter of Example 19, and optionally, wherein the message includes group information corresponding to the group of access points, the group information including at least one information element selected from the group consisting of global coordinates of the origin point, a measurement accuracy of the global coordinates of the origin point, and orientation information defining an orientation of the local coordinates.

Example 21 includes the subject matter of Example 19 or 20, and optionally, wherein the message comprises a neighbor report frame transmitted from the access point.

Example 22 includes the subject matter of Example 19 or 20, and optionally, wherein the mobile device is to transmit a Location Configuration Information (LCI) Request to the access point, the LCI Request including a field, which includes the group identifier, and wherein the mobile device is to receive from the access point a LCI Response including a field, which includes the group identifier, local coordinates of the access point, a relative error and an accuracy of the local coordinates.

Example 23 includes the subject matter of Example 19 or 20, and optionally, wherein the message comprises a beacon broadcasted by the access point.

Example 24 includes the subject matter of Example 19 or 20, and optionally, wherein the message comprises response transmitted from access point.

Example 25 includes the subject matter of any one of Examples 15-24, and optionally, wherein the group identifier is based on a media-access-control (MAC) address of an access point of the group of access points.

Example 26 includes a system comprising a wireless communication device including at least one antenna; and a wireless communication unit to communicate a message between an access point and a mobile device, the message including a group identifier to indicate the access point belongs to a group of two or more access points having local coordinates measured with respect to a common origin point.

Example 27 includes the subject matter of Example 26, and optionally, wherein the message includes local coordinates of the access point relative to the common origin point.

Example 28 includes the subject matter of Example 26 or 27, and optionally, wherein the message includes group information corresponding to the group of access points, the group information including at least one information element selected from the group consisting of global coordinates of the origin point, a measurement accuracy of the global coordinates of the origin point, and orientation information defining an orientation of the local coordinates.

Example 29 includes the subject matter of any one of Examples 25-28, and optionally, wherein the message comprises a neighbor report frame transmitted from the access point to the mobile device.

Example 30 includes the subject matter of any one of Examples 25-28, and optionally, wherein the message comprises a Location Configuration Information (LCI) Request transmitted from the mobile device to the access point, the LCI Request including a field, which includes the group identifier.

Example 31 includes the subject matter of any one of Examples 25-28, and optionally, wherein the message comprises a Location Configuration Information (LCI) Response, transmitted from the access point to the mobile device, the LCI Response including a field, which includes the group identifier, and local coordinates of the access point.

Example 32 includes the subject matter of any one of Examples 25-28, and optionally, wherein the message comprises a beacon broadcasted by the access point.

Example 33 includes the subject matter of any one of Examples 25-28, and optionally, wherein the message comprises a probe request transmitted from the mobile device to the access point.

Example 34 includes the subject matter of any one of Examples 25-28, and optionally, wherein the message comprises a probe response transmitted from the access point to the mobile device.

Example 35 includes the subject matter of any one of Examples 25-34, and optionally, wherein the group identifier is based on a media-access-control (MAC) address of an access point of the group of access points.

Example 36 includes the subject matter of any one of Examples 25-35, and optionally, wherein the wireless communication device comprises the access point.

Example 37 includes the subject matter of any one of Examples 25-35, and optionally, wherein the wireless communication device comprises the mobile device.

Example 38 includes the subject matter of any one of Examples 25-35, and optionally, wherein the wireless communication unit is to receive the message.

Example 39 includes the subject matter of any one of Examples 25-35, and optionally, wherein the wireless communication unit is to transmit the message.

Example 40 includes a method comprising communicating a message between an access point and a mobile device, the message including a group identifier to indicate the access point belongs to a group of two or more access points having local coordinates measured with respect to a common origin point.

Example 41 includes the subject matter of Example 40, and optionally, wherein the message includes local coordinates of the access point relative to the common origin point.

Example 42 includes the subject matter of Example 40 or 41, and optionally, wherein the message includes group information corresponding to the group of access points, the group information including at least one information element selected from the group consisting of global coordinates of the origin point, a measurement accuracy of the global coordinates of the origin point, and orientation information defining an orientation of the local coordinates.

Example 43 includes the subject matter of any one of Examples 42, and optionally, wherein the message comprises a neighbor report frame transmitted from the access point to the mobile device.

Example 44 includes the subject matter of any one of Examples 40-42, and optionally, wherein the message comprises a Location Configuration Information (LCI) Request transmitted from the mobile device to the access point, the LCI Request including a field, which includes the group identifier.

Example 45 includes the subject matter of any one of Examples 40-42, and optionally, wherein the message comprises a Location Configuration Information (LCI) Response, transmitted from the access point to the mobile device, the LCI Response including a field, which includes the group identifier, and local coordinates of the access point.

Example 46 includes the subject matter of any one of Examples 40-42, and optionally, wherein the message comprises a beacon broadcasted by the access point.

Example 47 includes the subject matter of any one of Examples 40-42, and optionally, wherein the message comprises a probe request transmitted from the mobile device to the access point.

Example 48 includes the subject matter of any one of Examples 40-42, and optionally, wherein the message comprises a probe response transmitted from the access point to the mobile device.

Example 49 includes the subject matter of any one of Examples 40-48, and optionally, wherein the group identifier is based on a media-access-control (MAC) address of an access point of the group of access points.

Example 50 includes the subject matter of any one of Examples 40-49, and optionally, comprising communicating the message by the access point.

Example 51 includes the subject matter of any one of Examples 40-49, and optionally, comprising communicating the message by the mobile device.

Example 52 includes the subject matter of any one of Examples 40-49, and optionally, comprising receiving the message.

Example 53 includes the subject matter of any one of Examples 40-49, and optionally, comprising transmitting the message.

Example 54 includes a method comprising receiving at a mobile device a message including a group identifier to indicate a group of two or more access points having local coordinates measured with respect to a common origin point; and selecting, based on the group identifier, one or more access points to be used by a mobile device to estimate a location of the mobile device.

Example 55 includes the subject matter of Example 54, and optionally, comprising prioritizing an access point belonging to the group of access points over an access point not belonging to the group of access points.

Example 56 includes the subject matter of Example 54, and optionally, comprising selecting a plurality of access points to be used to estimate a location of the mobile device, each of the plurality of access points belonging to the group of access points.

Example 57 includes the subject matter of Example 56, and optionally, comprising selecting an access point not belonging to the group of access points, applying a first weight to a location-related measurement with the access point not belonging to the group of access points, and applying a second weight to a location-related measurement with an access point belonging to the group of access points, the second weight is greater than the first weight.

Example 58 includes the subject matter of any one of Examples 54-57, and optionally, wherein the message includes local coordinates of an access point of the group of access points relative to the common origin point.

Example 59 includes the subject matter of Example 58, and optionally, wherein the message includes group information corresponding to the group of access points, the group information including at least one information element selected from the group consisting of global coordinates of the origin point, a measurement accuracy of the global coordinates of the origin point, and orientation information defining an orientation of the local coordinates.

Example 60 includes the subject matter of Example 58 or 59, and optionally, wherein the message comprises a neighbor report frame transmitted from the access point.

Example 61 includes the subject matter of Example 58 or 59, and optionally, comprising transmitting a Location Configuration Information (LCI) Request to the access point, the LCI Request including a field, which includes the group identifier, and receiving from the access point a LCI Response including a field, which includes the group identifier, local coordinates of the access point, a relative error and an accuracy of the local coordinates.

Example 62 includes the subject matter of Example 58 or 59, and optionally, wherein the message comprises a beacon broadcasted by the access point.

Example 63 includes the subject matter of Example 58 or 59, and optionally, wherein the message comprises response transmitted from access point.

Example 64 includes the subject matter of any one of Examples 54-63, and optionally, wherein the group identifier is based on a media-access-control (MAC) address of an access point of the group of access points.

Example 65 includes a product including a non-transitory storage medium having stored thereon instructions that, when executed by a machine, result in communicating a message between an access point and a mobile device, the message including a group identifier to indicate the access point belongs to a group of two or more access points having local coordinates measured with respect to a common origin point.

Example 66 includes the subject matter of Example 65, and optionally, wherein the message includes local coordinates of the access point relative to the common origin point.

Example 67 includes the subject matter of Example 65 or 66, and optionally, wherein the message includes group information corresponding to the group of access points, the group information including at least one information element selected from the group consisting of global coordinates of the origin point, a measurement accuracy of the global coordinates of the origin point, and orientation information defining an orientation of the local coordinates.

Example 68 includes the subject matter of any one of Examples 65-67, and optionally, wherein the message comprises a neighbor report frame transmitted from the access point to the mobile device.

Example 69 includes the subject matter of any one of Examples 65-67, and optionally, wherein the message comprises a Location Configuration Information (LCI) Request transmitted from the mobile device to the access point, the LCI Request including a field, which includes the group identifier.

Example 70 includes the subject matter of any one of Examples 65-67, and optionally, wherein the message comprises a Location Configuration Information (LCI) Response, transmitted from the access point to the mobile device, the LCI Response including a field, which includes the group identifier, and local coordinates of the access point.

Example 71 includes the subject matter of any one of Examples 65-67, and optionally, wherein the message comprises a beacon broadcasted by the access point.

Example 72 includes the subject matter of any one of Examples 65-67, and optionally, wherein the message comprises a probe request transmitted from the mobile device to the access point.

Example 73 includes the subject matter of any one of Examples 65-67, and optionally, wherein the message comprises a probe response transmitted from the access point to the mobile device.

Example 74 includes the subject matter of any one of Examples 65-67, and optionally, wherein the group identifier is based on a media-access-control (MAC) address of an access point of the group of access points.

Example 75 includes the subject matter of any one of Examples 65-74, and optionally, wherein the instructions result in communicating the message by the access point.

Example 76 includes the subject matter of any one of Examples 65-74, and optionally, wherein the instructions result in communicating the message by the mobile device.

Example 77 includes the subject matter of any one of Examples 65-74, and optionally, wherein the instructions result in receiving the message.

Example 78 includes the subject matter of any one of Examples 65-74, and optionally, wherein the instructions result in transmitting the message.

Example 79 includes a product including a non-transitory storage medium having stored thereon instructions that, when executed by a machine, result in receiving at a mobile device a message including a group identifier to indicate a group of two or more access points having local coordinates measured with respect to a common origin point; and selecting, based on the group identifier, one or more access points to be used by a mobile device to estimate a location of the mobile device.

Example 80 includes the subject matter of Example 79, and optionally, wherein the instructions result in prioritizing an access point belonging to the group of access points over an access point not belonging to the group of access points.

Example 81 includes the subject matter of Example 79, and optionally, wherein the instructions result in selecting a plurality of access points to be used to estimate a location of the mobile device, each of the plurality of access points belonging to the group of access points.

Example 82 includes the subject matter of Example 81, and optionally, wherein the instructions result in selecting an access point not belonging to the group of access points, applying a first weight to a location-related measurement with the access point not belonging to the group of access points, and applying a second weight to a location-related measurement with an access point belonging to the group of access points, the second weight is greater than the first weight.

Example 83 includes the subject matter of any one of Examples 79-82, and optionally, wherein the message includes local coordinates of an access point of the group of access points relative to the common origin point.

Example 84 includes the subject matter of Example 83, and optionally, wherein the message includes group information corresponding to the group of access points, the group information including at least one information element selected from the group consisting of global coordinates of the origin point, a measurement accuracy of the global coordinates of the origin point, and orientation information defining an orientation of the local coordinates.

Example 85 includes the subject matter of Example 83 or 84, and optionally, wherein the message comprises a neighbor report frame transmitted from the access point.

Example 86 includes the subject matter of Example 83 or 84, and optionally, wherein the instructions result in transmitting a Location Configuration Information (LCI) Request to the access point, the LCI Request including a field, which includes the group identifier, and receiving from the access point a LCI Response including a field, which includes the group identifier, local coordinates of the access point, a relative error and an accuracy of the local coordinates.

Example 87 includes the subject matter of Example 83 or 84, and optionally, wherein the message comprises a beacon broadcasted by the access point.

Example 88 includes the subject matter of Example 83 or 84, and optionally, wherein the message comprises response transmitted from access point.

Example 89 includes the subject matter of any one of Examples 79-88, and optionally, wherein the group identifier is based on a media-access-control (MAC) address of an access point of the group of access points.

Example 90 includes an apparatus comprising means for communicating a message between an access point and a mobile device, the message including a group identifier to indicate the access point belongs to a group of two or more access points having local coordinates measured with respect to a common origin point.

Example 91 includes the subject matter of Example 90, and optionally, wherein the message includes local coordinates of the access point relative to the common origin point.

Example 92 includes the subject matter of Example 90 or 91, and optionally, wherein the message includes group information corresponding to the group of access points, the group information including at least one information element selected from the group consisting of global coordinates of the origin point, a measurement accuracy of the global coordinates of the origin point, and orientation information defining an orientation of the local coordinates.

Example 93 includes the subject matter of any one of Examples 90-92, and optionally, wherein the message comprises a neighbor report frame transmitted from the access point to the mobile device.

Example 94 includes the subject matter of any one of Examples 90-92, and optionally, wherein the message comprises a Location Configuration Information (LCI) Request transmitted from the mobile device to the access point, the LCI Request including a field, which includes the group identifier.

Example 95 includes the subject matter of any one of Examples 90-92, and optionally, wherein the message comprises a Location Configuration Information (LCI) Response, transmitted from the access point to the mobile device, the LCI Response including a field, which includes the group identifier, and local coordinates of the access point.

Example 96 includes the subject matter of any one of Examples 90-92, and optionally, wherein the message comprises a beacon broadcasted by the access point.

Example 97 includes the subject matter of any one of Examples 90-92, and optionally, wherein the message comprises a probe request transmitted from the mobile device to the access point.

Example 98 includes the subject matter of any one of Examples 90-92, and optionally, wherein the message comprises a probe response transmitted from the access point to the mobile device.

Example 99 includes the subject matter of any one of Examples 90-98, and optionally, wherein the group identifier is based on a media-access-control (MAC) address of an access point of the group of access points.

Example 100 includes the subject matter of any one of Examples 90-99, and optionally, comprising means for communicating the message by the access point.

Example 101 includes the subject matter of any one of Examples 90-99, and optionally, comprising means for communicating the message by the mobile device.

Example 102 includes the subject matter of any one of Examples 90-99, and optionally, comprising means for receiving the message.

Example 103 includes the subject matter of any one of Examples 90-99, and optionally, comprising means for transmitting the message.

Example 104 includes an apparatus comprising means for receiving at a mobile device a message including a group identifier to indicate a group of two or more access points having local coordinates measured with respect to a common origin point; and means for selecting, based on the group identifier, one or more access points to be used by a mobile device to estimate a location of the mobile device.

Example 105 includes the subject matter of Example 104, and optionally, comprising means for prioritizing an access point belonging to the group of access points over an access point not belonging to the group of access points.

Example 106 includes the subject matter of Example 104, and optionally, comprising means for selecting a plurality of access points to be used to estimate a location of the mobile device, each of the plurality of access points belonging to the group of access points.

Example 107 includes the subject matter of Example 106, and optionally, comprising means for selecting an access point not belonging to the group of access points, applying a first weight to a location-related measurement with the access point not belonging to the group of access points, and applying a second weight to a location-related measurement with an access point belonging to the group of access points, the second weight is greater than the first weight.

Example 108 includes the subject matter of any one of Examples 104-107, and optionally, wherein the message includes local coordinates of an access point of the group of access points relative to the common origin point.

Example 109 includes the subject matter of Example 108, and optionally, wherein the message includes group information corresponding to the group of access points, the group information including at least one information element selected from the group consisting of global coordinates of the origin point, a measurement accuracy of the global coordinates of the origin point, and orientation information defining an orientation of the local coordinates.

Example 110 includes the subject matter of Example 108 or 109, and optionally, wherein the message comprises a neighbor report frame transmitted from the access point.

Example 111 includes the subject matter of Example 108 or 109, and optionally, comprising means for transmitting a Location Configuration Information (LCI) Request to the access point, the LCI Request including a field, which includes the group identifier, and receiving from the access point a LCI Response including a field, which includes the group identifier, local coordinates of the access point, a relative error and an accuracy of the local coordinates.

Example 112 includes the subject matter of Example 108 or 109, and optionally, wherein the message comprises a beacon broadcasted by the access point.

Example 113 includes the subject matter of Example 108 or 109, and optionally, wherein the message comprises response transmitted from access point.

Example 114 includes the subject matter of any one of Examples 104-113, and optionally, wherein the group identifier is based on a media-access-control (MAC) address of an access point of the group of access points.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. An apparatus comprising logic and circuitry configured to cause a first wireless station to:
   process a Location Configuration Information (LCI) report from a second wireless station, the LCI report comprising a relative orientation subelement, which is configured to indicate a relative orientation of the second wireless station with respect to a reference point; and
   estimate a location of said first wireless station based at least in part on the relative orientation of the second wireless station.

2. The apparatus of claim 1 configured to cause the first wireless station to process a neighbor report from the second wireless station, the neighbor report comprising the LCI report and information of a plurality of access points to be used by said first wireless station to estimate the location of said first wireless station.

3. The apparatus of claim 1, wherein the LCI report comprises latitude information, longitude information, and altitude information.

4. The apparatus of claim 1, wherein the relative orientation subelement is to indicate an orientation error of the second wireless station with respect to an origin point or a coordinate system.

5. The apparatus of claim 1, wherein the LCI report comprises a group identifier of a group of wireless stations having an orientation measured with respect to the reference point.

6. The apparatus of claim 1, wherein the LCI report comprises one or more coordinates of the reference point.

7. The apparatus of claim 1 configured to cause the first wireless station to transmit an LCI request, the LCI report is in response to the LCI request.

8. The apparatus of claim 1, wherein the first wireless station comprises a mobile device.

9. The apparatus of claim 1, wherein the second wireless station comprises an access point (AP).

10. The apparatus of claim 1 comprising a radio to receive the LCI report.

11. The apparatus of claim 1 comprising one or more antennas.

12. An apparatus comprising logic and circuitry configured to cause a first wireless station to:
    process a Location Configuration Information (LCI) request from a second wireless station; and
    transmit to the second wireless station an LCI report in response to the LCI request, the LCI report comprising a relative orientation subelement, which is configured to indicate a relative orientation of the first wireless station with respect to a reference point.

13. The apparatus of claim 12 configured to cause the first wireless station to transmit a neighbor report to the second wireless station, the neighbor report comprising the LCI report and information of a plurality of access points.

14. The apparatus of claim 12, wherein the LCI report comprises latitude information, longitude information, and altitude information.

15. The apparatus of claim 12, wherein the relative orientation subelement is to indicate an orientation error of the first wireless station with respect to an origin point or a coordinate system.

16. The apparatus of claim 12, wherein the LCI report comprises a group identifier of a group of wireless stations having an orientation measured with respect to the reference point.

17. The apparatus of claim 12, wherein the LCI report comprises one or more coordinates of the reference point.

18. The apparatus of claim 12, wherein the first wireless station comprises an access point (AP).

19. The apparatus of claim 12, wherein the second wireless station comprises a mobile device.

20. The apparatus of claim 12 comprising a radio to receive the LCI request, and to transmit the LCI report.

21. The apparatus of claim 12 comprising one or more antennas.

22. A product comprising one or more tangible computer-readable non-transitory storage media comprising computer-executable instructions operable to, when executed by at least one processor, enable the at least one processor to cause a first wireless station to:
    process a Location Configuration Information (LCI) report from a second wireless station, the LCI report comprising a relative orientation subelement, which is configured to indicate a relative orientation of the second wireless station with respect to a reference point; and
    estimate a location of said first wireless station based at least in part on the relative orientation of the second wireless station.

23. The product of claim 22, wherein the relative orientation subelement is to indicate an orientation error of the second wireless station with respect to an origin point or a coordinate system.

24. A product comprising one or more tangible computer-readable non-transitory storage media comprising computer-executable instructions operable to, when executed by at least one processor, enable the at least one processor to cause a first wireless station to:
    process a Location Configuration Information (LCI) request from a second wireless station; and
    transmit to the second wireless station an LCI report in response to the LCI request, the LCI report comprising a relative orientation subelement, which is configured to indicate a relative orientation of the first wireless station with respect to a reference point.

25. The product of claim 24, wherein the LCI report comprises a group identifier of a group of wireless stations having an orientation measured with respect to the reference point.

* * * * *